May 2, 1961 R. A. WOLFE 2,982,553

RECORD CHANGER

Filed April 8, 1959

3 Sheets-Sheet 1

INVENTOR
Robert A. Wolfe

BY Wooster & Davis
ATTORNEYS.

INVENTOR
Robert A. Wolfe
BY
Wooster & Davis
ATTORNEYS.

May 2, 1961

R. A. WOLFE 2,982,553

RECORD CHANGER

Filed April 8, 1959

3 Sheets-Sheet 3

INVENTOR
Robert A. Wolfe
BY
Wooster & Davis
ATTORNEYS.

United States Patent Office 2,982,553
Patented May 2, 1961

2,982,553

RECORD CHANGER

Robert A. Wolfe, Fairfield, Conn., assignor to Spear Products, Incorporated, Bridgeport, Conn., a corporation of Connecticut Filed Apr. 8, 1959, Ser. No. 804,994

7 Claims. (Cl. 274—10)

This invention relates to a record changer for phonographs and has for an object to provide an improved construction of record changer which can be set to automatically place the tone arm and pick-up needle in proper position for playing records of different sizes or diameters.

It is also an object to provide an improved construction of changer of the type which at the end of the playing of the record will automatically lift the tone arm and needle from the playing position and swing the tone arm to an inoperative position to permit a new record to be dropped onto the turntable, and then will automatically return the tone arm and needle to the proper playing position at the beginning of the record and will lower the needle to this position.

With the foregoing and other objects in view, I have devised the construction illustrated in the accompanying drawings forming a part of this specification. It is, however, to be understood the invention is not limited to the specific details of construction and arrangement shown, but may embody various change sand modifications within the scope of the invention.

Figures 1, 2, 10, 11, 12:
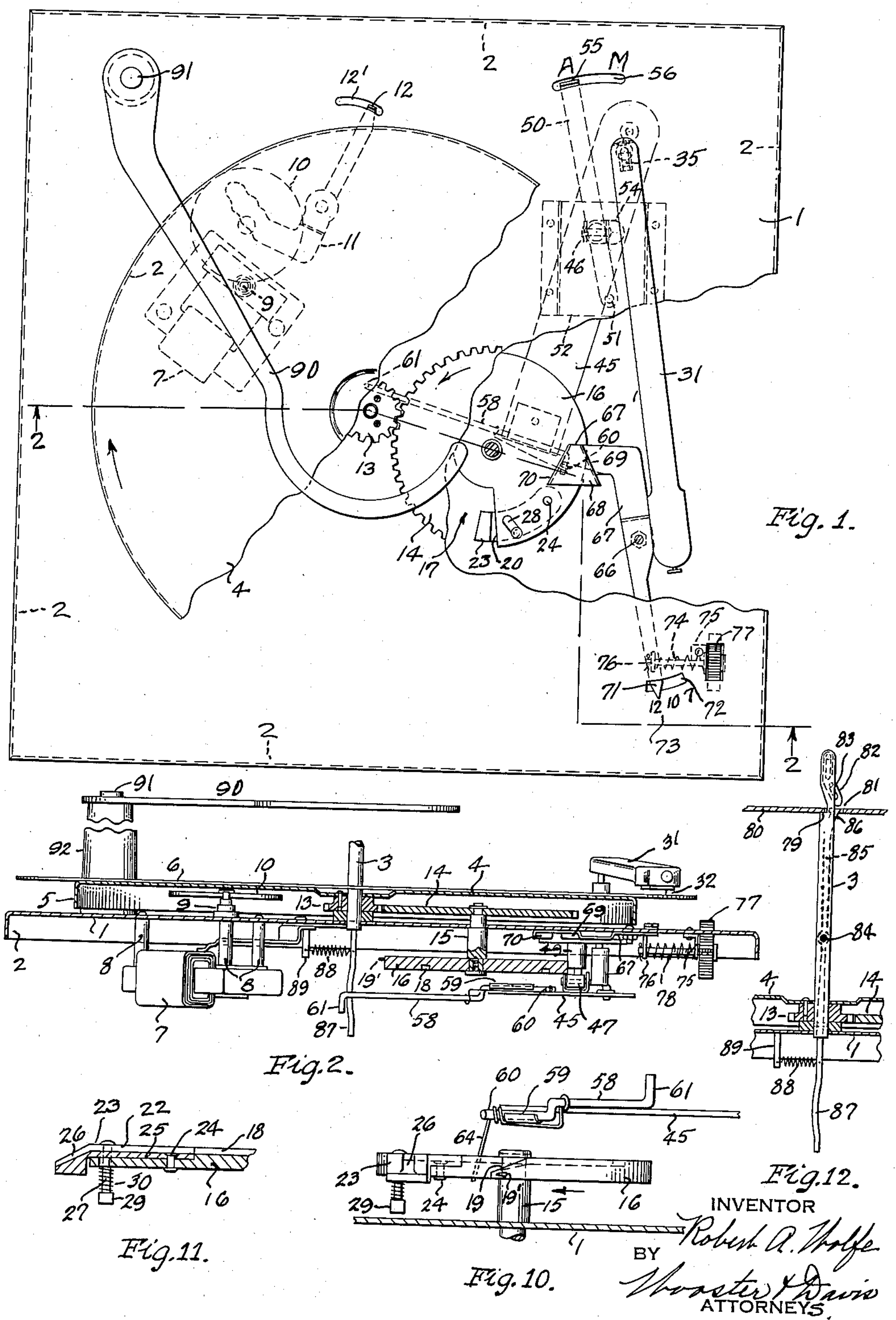
Fig. 1 is a top plan view of the changer including a top plate on which the device is mounted, with parts broken away to more clearly show the construction.
Fig. 2 is a vertical section thereof substantially on line 2—2 of Fig. 1.
Fig. 10 is a side view of the control cam taken substantially on line 10—10 of Fig. 3 with the parts inverted.
Fig. 11 is a detail section with the parts inverted taken longitudinally of the movable section of the control cam substantially on line 11—11 of Fig. 3.
Fig. 12 is a partial side view and partial section showing the record supporting post and the means for shifting the record from this supporting post to permit it to drop onto the turntable.

The device comprises a supporting table or plate 1 adapted to be mounted in position in a cabinet or similar device, and carrying the mechanism comprising this improved record changer. This may be a sheet metal plate provided with a downwardly extending peripheral flange 2 for stiffening purposes and also providing a finished edge. Mounted in the plate 1 and extending upwardly therefrom is the upright post 3 about which the turntable 4 is mounted to rotate and which is provided with means for supporting a stack of records one above the other to be dropped successively on the turntable for successive playing of these records. The turntable 4 may also be of sheet metal and provided with a downwardly extending peripheral flange 5 for stiffening and finishing the edge of the table, and it may or may not have a covering of flock or fabric (not shown) on its top surface. A disc record 6 is shown as supported on this table in playing position. This table is driven by any suitable means such, for example, as an electric motor 7 suspended by suitable posts or similar supports 8 on the under side of the plate 1 and operating a shaft 9 having steps of different diameters providing a frictional drive for a drive wheel 10 arranged with its peripheral edge engaging the inner side of the flange 5 of the turntable to impart turning movements of the proper speed to the table, the wheel 10 being mounted on a support (not shown) by which it may be shifted to engage different diameter steps on the motor shaft 9 by hand-operated adjusting means 11 to vary the speed of the turntable for playing, for example, 78 r.p.m., 45 r.p.m., and 33⅓ r.p.m. types of record, a finger grip 12 being provided for effecting this adjustment, and extending upwardly through a slot 12' in the plate to an accessible position. This motor is shown merely as an operating means for rotating the turntable at the proper speeds.

Secured to the under side of the turntable 4 is a pinion gear 13 meshing with a larger gear 14 on the upper end of a shaft 15 mounted in a bearing in the plate 1 and carrying at its lower end below this plate a rotatable cam 16 operated through this shaft 15 by the gears 13 and 14, which are in turn driven by the rotating turntable 4. This cam disc is notched or provided with a cut-out recess at one side, as indicated at 17, and is provided with an eccentric cam groove 18 in its under side leading from the forward edge 19 of this recess to the rear edge 20 of this recess. A control hook 19' is mounted in the outer rim of disc 16 at the outer end of wall 19. The entrance 21 to this channel is located inwardly toward the axis of the disc and the channel is eccentric so that it gradually moves outwardly to a substantially concentric portion 18' adjacent the outer rim of the disc, and at the outer end of this channel and in alignment therewith is provided a continuing channel 22 formed in the under surface of a movable section 23 pivoted to the disc on a pivot pin 24 (Fig. 11) extending through both the section 23 and the portion of the disc above it, these parts being shown inverted in Figs. 10 and 11. The under surface of the disc 16 is recessed, as indicated at 25, in which the pivoted section 23 is mounted so that its under surface and the top surface of the channel 22 are even with the top of the channel 18'. The free or exit end of this channel, however, is inclined upwardly toward its outer end, it being inverted as shown at 26 in Fig. 11. The section 23 may be swung about the pivot 24 to different angular positions about this pivot to locate the inclined end 26 of the channel 22 in this section at different radial positions or distances from the axis of the disc 16, for a purpose later to be described. It is frictionally held in these different angular positions by a pin 27 (Fig. 7) mounted in the section 23 and passing through an elongated slot 28 (Figs. 1 and 3) in the disc 16 through the top of the recess 25. This pin extends upwardly above the disc where it is provided with an enlarged head 29 spaced above the disc for a purpose presently to be described, and a coil spring 30 embraces this pin between the head and the disc 16 to provide a friction means to retain the section 23 in different angular positions, but permit it to be shifted to these positions.

Figure 16:
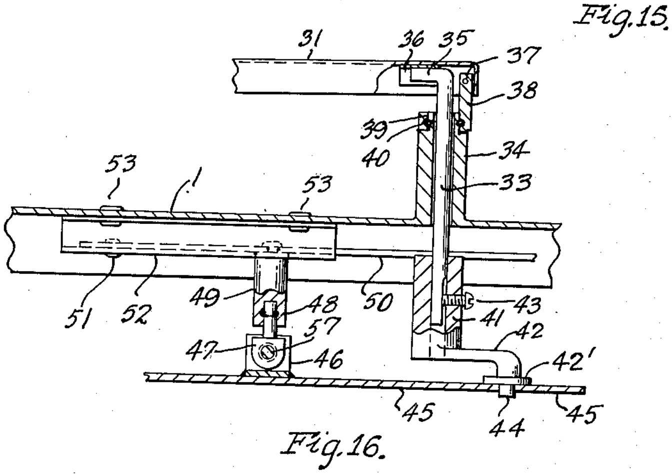
Fig. 16 is a detail sectional view showing the mounting for the tone arm.

Mounted above the plate 1 is the tone arm 31 carrying at its free end any suitable type of pick-up needle 32 and cartridge, and this arm is mounted at its opposite end by supporting means by which the free end carrying the needle may be shifted vertically between upper and lower positions and swung to and from playing positions over the record on the turntable 4 in certain timed relation with the dropping of the record to the turntable. This mounting means for the tone arm comprises a spindle 33 (Fig. 16) mounted in an upright bearing 34 extending upwardly from the top of the plate 1 and having an offset 35 at its upper end extending into and straddled by an inverted U-shaped member 36 secured on the under side of the top wall of the tone arm, which arm in the arrangement shown is of inverted U-shaped cross section. The tone arm is also pivoted on a transverse pin 37 for up and down movement on a supporting post 38 mounted to turn about a reduced bearing 39 on the top of the bearing 34 and held against longitudinal movement thereon by any suitable means, such, for example, as a spring ring 40 in aligned peripheral grooves in the outer surface of the reduced portion of the member 34 and the inner surface of the member 38. The spindle 33 extends below the plate 1 and has mounted on its lower end the boss 41 of a crank arm 42, and this crank arm may be secured to the spindle by a suitable set screw 43. The arm 42 has an angular offset 44 at its free end extending through an opening in a control lever 45 with a stop flange 42' resting on top of lever 45 and secured to crank arm 42. This control lever 45 may be a flat metal bar, and is mounted intermediate its ends by a U-shaped bracket 46 secured to the top thereof and embracing the end 47 of a stud 48 mounted for turning movement about a vertical axis in a downwardly extending lug 49 depending from a pivoted arm 50, this arm being mounted to swing about a pivotal connection 51 to a U-shaped supporting bracket 52 mounted by any suitable means such as rivets 53 on the under side of the plate 1, this lug 49 passing through an elongated opening 54 (Fig. 1) in the wall of bracket 52. At its opposite free end the lever arm 50 is provided with an upwardly extending finger grip 55 in an elongated slot 56 in the plate 1 by means of which the lever may be shifted to different angular positions to shift the pivot lug 49 to effect either automatic or manual control of the exchanger, as will presently be described.

Figures 3, 4, 5, 6, 7, 8, 9:
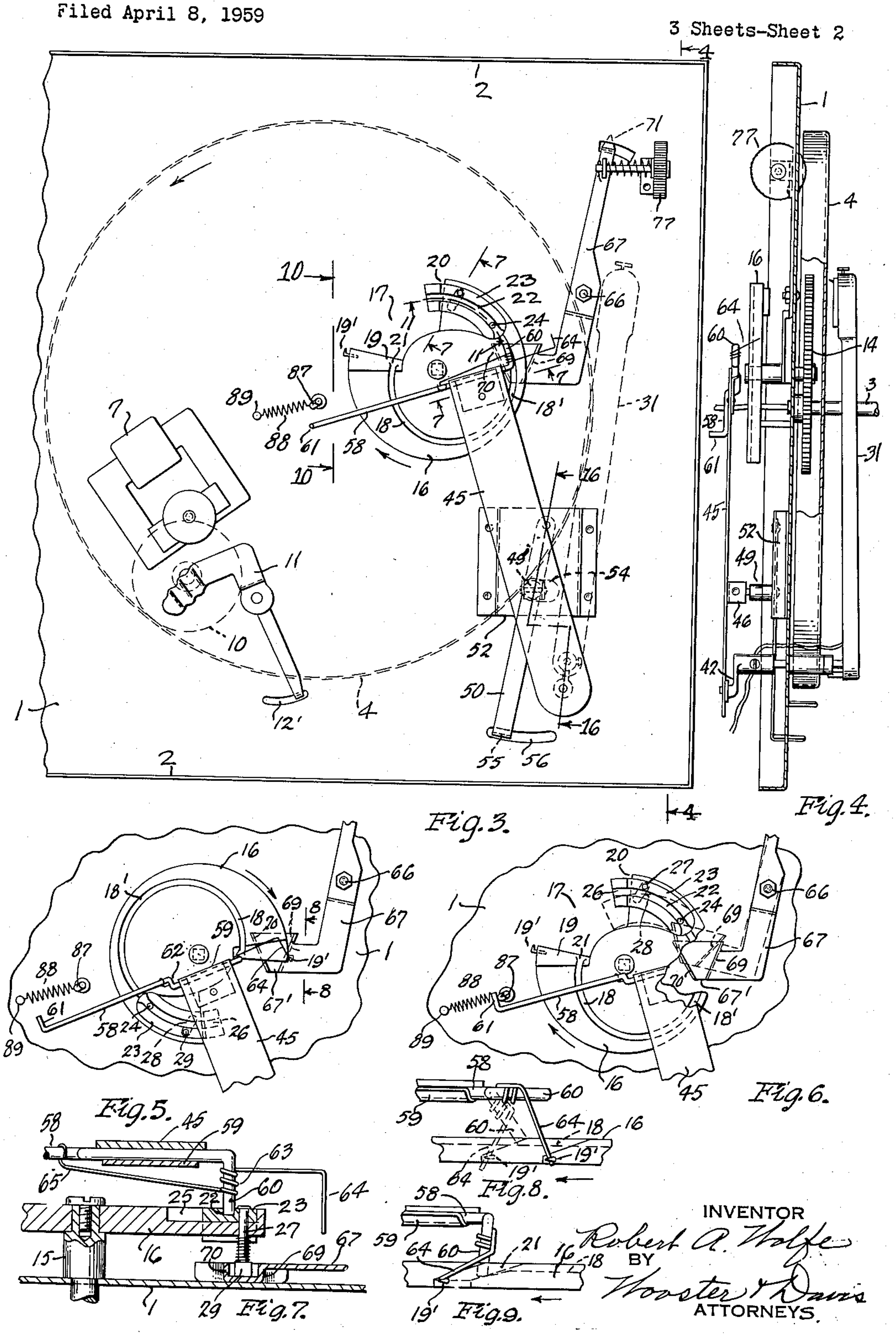
Fig. 3 is a bottom plan view.
Fig. 4 is a partial edge view and partial section looking from the right of Fig. 3, the section being taken substantially on line 4—4 of Fig. 3, and a portion of the edge flange of the turntable broken away to more clearly show the construction.
Fig. 5 is a bottom plan view of the control cam showing the position of the parts at the end of the playing of the record.
Fig. 6 is a bottom plan view of the control cam with the parts in the position at about the time a new record is being dropped to the turntable in position for playing.
Fig. 7 is detail sections on an enlarged scale of a portion of the cam control disc and the movable section thereof and the coacting end portion of the control rod, the sections being substantially on the lines 7—7 of Fig. 3 and the parts being shown inverted.
Fig. 8 is a detail side view of a portion of the control cam at the end of the record playing with the parts inverted, the view being substantially on line 8—8 of Fig. 5 with the cam setting means omitted.
Fig. 9 is a similar view showing the control shifted to a different position and also inverted.

The control lever 45 is mounted for vertical swinging movement on the stud or lug 49 by means of a transverse pivot 57 in the head 47 and the sides of the bracket 46. At the opposite end of the control lever 45 from the crank arm 42 and on the opposite side of its supporting pivot 57 is mounted a control rod 58. This rod is mounted for turning movement in a bearing 59 on the top of the control lever 45. At one end it has a laterally or substantially right angularly extending free end portion 60 and at its opposite end a laterally extending free end portion 61. The portion of the rod within the bearing 59 may be offset as indicated at 62 so as to hold this control rod against longitudinal sliding movements in the bearing 59, but permitting turning movements in this bearing. Wrapped around extension 60, as shown in Fig. 7, is a wire 63 having a portion extending outwardly from the portion 60 and provided with an upwardly extending angularly offset portion 64, and its other end may be extended as shown at 65, and wrapped around the control bar 58 at the opposite side of the bearing.

Mounted on the under side of the plate 1 on a suitable pivot 66 is a lever 67 carrying means for setting the angular section 23 of the cam disc. At its free end this lever is provided with a setting or guide means 68 provided with oppositely inclined guide side walls 69 and 70 adapted to receive the enlarged head 29 of the stud 27 to shift this stud and the section 23 to different angular positions about the pivotal connection 24 for the section 23, to thus position the inclined outlet 26 of the channel in this section at different angular positions about this pivot 24 and thus vary the radial positions and distances of this inclined outlet portion 26 from the center axis of the cam disc 16. The opposite end of the lever 67 includes a pointer 71 projecting through a slot 72 in the plate 1 and movable over indications 73 which indicate the angular position of the lever 67 and the inclined guides or cams 69 or 70, and this lever may be shifted to different angular positions by means of a threaded screw 74 mounted in a suitable supporting bracket 75 at the under side of the plate and passing through a downwardly extending lug 76 on the lever 67. At its opposite end screw 74 is threaded into a rotatable finger wheel 77 projecting upwardly through a slot in the plate 1 with a coil spring 78 embracing this screw between the bracket 75 and lug 76 to provide a friction means for resisting turning of the wheel and holding the lever in different adjusted positions. The slot 72 may be calibrated, as indicated at 73, to indicate the proper position for the lever for playing different sizes of records, such, for example, as indicated, 12-inch, ten-inch and seven-inch records.

The post 3 for carrying a tack of records and the means for dropping them onto the turntable may be of any suitable type, that shown comprising an upright hollow tube of suitable height provided adjacent its upper end with a notch in one side providing a shoulder 79 for supporting a stack of records, one of which 80 only is shown, with its central opening 81 embracing the post and seating at one side of this opening on shoulder 79. When the record is threaded onto the post from its upper end the inclined edge 82 of the vertically slidable cam member 83 acts on the opposite side edge of the opening 81 to shift the record onto this shoulder 79. Mounted within the hollow spindle or post 3 on a transverse pivot pin 84 is a lever 85 having an upper end 86 extending into the opening in the record, and the lower end 87 projecting from the under side of the plate 1 in position to be engaged, under certain conditions, by the offset 61 of the control rod 58 to shift the lever 85 and shift its upper end 86 to the left to ride on the edge of the opening 81 in the record to shift this record off the supporting shoulder 79 and permit it to slide down the post to the top of the turntable 4. The lower end 87 of the lever is normally held in the retracted position by a spring 88 connected at its opposite end to a downwardly extending pin 89 on the under side of the plate 1.

The usual arm 90 may be pivoted at 91 on top of the upwardly extending post 92 on the upper side of plate 1 and swingable to and from a position on top of the top record of the stack on post 3 to hold the records in a horizontal position.

Figure 13:
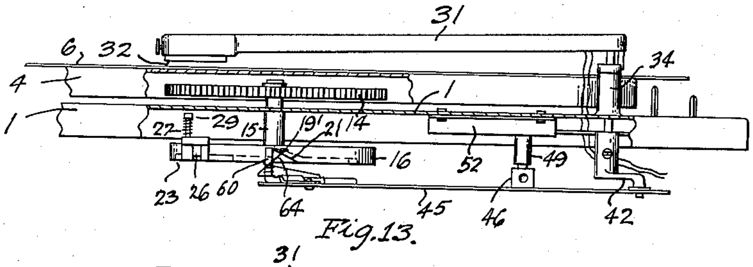
Fig. 13 is a partial side view and partial section showing the parts in the position at the end of the playing of the record.
Figure 14:
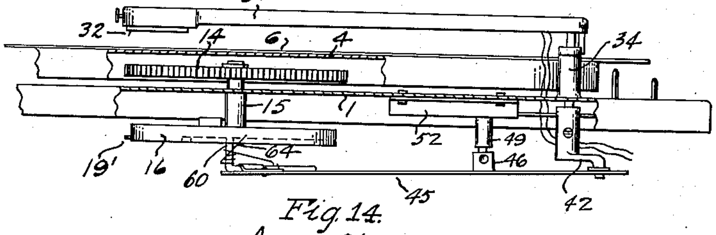
Fig. 14 is a similar view showing the parts in the position with the tone arm raised and swung back out of playing position.

The operation is as follows:

As the turntable 4 is rotated by the motor 7 it rotates the pinion 13 which in turn rotates the gear 14 and the cam disc 16. During the playing of the record the free end of the tone arm 31 is swung over the record with the pick-up needle 32 running in the sound track of the record. During this time the control rod 58 is turned to a position such that its angularly offset free end portion 60 is in substantially the plane of the body portion of the rod as shown in full lines in Figs. 4 and 8, and spaced from the cam disc 16. As the needle follows the sound track inwardly toward the center of the record it swings the free end of the tone arm inwardly, its pivoted support 38 turning with it. As the arm swings inwardly it turns the spindle 33 by means of its upper offset end 35, and as spindle 33 turns it swings crank arm 42. As this crank arm 42 turns it swings the control lever 45 about its vertical supporting axis in the lug 49. This swings the opposite end of lever 45 and the control rod 58 carried by it inwardly or to the left as viewed in Figs. 1, 3, 5 and 6. This thus shifts the inner end of lever 45 carrying the control rod 58 inwardly from its outer position of Figs. 1, 3 and 6 to its inner position of Fig. 5, which is its position at the end of playing of the record. During this inward movement while the record is playing the inclined end 64 of the flexible spring wire 63 on the offset end 60 of the control rod is spaced outwardly away from the rim of the cam disc 16 and thus in a position where it is out of the path of the hook 19' on the rim of the rotating cam disc 16. When the lever 45 is in its inner position of Fig. 5 at the end of playing of the record, the inclined wire 64 is brought into the path of hook 19' on the cam disc and this hook grips the wire, as shown in full lines Fig. 8, and its continued movement swings the wire 64 upwardly and it is rigid enough to carry with it the offset end 60 of the control rod 58, as shown in dotted lines Fig. 8 and full lines Fig. 9. This carries the free end of offset 60 to alignment with the downwardly inclined entrance 21 to the eccentric channel 18. This is the position of Fig. 13. This free end rides up this incline 21 into channel 18 and as it does so it shifts the inner free end of lever 45 downward swinging the lever about its pivot 57 and raising its outer or opposite end connected to crank arm 42. This movement acting against flange 42' shifts crank arm 42 and spindle 33 upwardly and through the offset upper end 35 swings the free end of the tone arm 31 upwardly about the pivot 37 and lifts the needle from the record. The parts are in the position of Fig. 14. As the free end of offset 60 follows around in the eccentric groove or channel 18 it is moved outwardly from its inner position of Fig. 5 carrying with it and control rod 58 and the free inner end of lever 45. This swings this end of lever 45 outwardly and swings this lever about its vertical axis in lug 49. This swings the outer free end of lever 45 about this axis turning crank arm 42 and spindle 33 to swing the free end of the tone arm outwardly to its outer position beyond the outer rim of the record, as shown in full lines in Fig. 1 and dotted lines Fig. 3. As the tone arm reaches this outer position the inner end of lever 45 and control rod 58 also reach their outer positions and as they do so the offset end 61 of rod 58 engages the depending lower end portion 87 of lever 85 in the record supporting post 3, drawing it to the right as shown in Figs. 2, 6 and 12 and shifting the upper end 86 of this lever to the left as viewed in Fig. 12 and shifting the lower record 80 off the supporting shoulder 79 so it passes down the post 3 to the top of the turntable.

Figure 15:
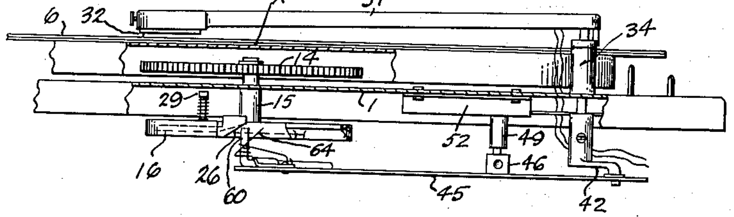
Fig. 15 is a similar view showing the tone arm swung back and lowered to a position for the beginning of the playing operation.

As the rod end 60 continues to follow the cam channel 18 from its outermost portion 18' into the channel 22 in the pivoted section 23, it is shifted inwardly toward the center of the cam disc 16 an amount and to a position as it passes off the inclined exit end 26 of the channel 22 in the section 23 depending on the angular position of this section, as will be further described. As the end of offset 60 is moved inwardly by channel 22 it swings the inner end of lever 45 inwardly or to the left as viewed in Figs. 1, 3 and 6. This movement of lever 45 acting through crank arm 42 and spindle 33, swings the free end of the tone arm 31 inwardly from its outer position of Figs. 1 and 3 to a position over the outer rim portion of the record and brings the needle over the narrow ungrooved portion at the outer side of the outer sound track. Then as the offset 60 runs out the inclined exit portion 26 of the channel 22 it permits the inner end of lever 45 to move upwardly and the free end of the tone arm to move downwardly and permit the needle to rest on top of the record and follow the sound groove for the playing operation. This is the position of parts as shown in Fig. 15.

As the free end of offset 60 runs up incline 21 and enters channel 18, the offset 64 of the flexible spring wire is released from the hook 19', but the end of offset 60 is held in the channel 18, by friction and slight backwardly inclined position, as shown in Fig. 9. As this end 60 runs off the inclined exit portion 26 of channel 22 it is freed and the control rod 58 is turned by spring 65 (Fig. 7) to its normal retracted position of Figs. 4, 8 and 10 where it is in position for the next control operation at the end of the playing operation, as indicated in Figs. 5, 8 and 9.

The position where the free end of the tone arm is lowered and the needle allowed to engage the record, that is, its distance from the center of the record for starting the playing of different diameters of records, is determined by the angular position of the pivoted section 23 on the cam disc 16; that is, the position and distance of the inclined exit portion 26 of the channel 22 in this section from the center of the turntable. If the free end of section 23 is in its outermost position then the needle is lowered onto the outer rim of a twelve-inch record; if it is in an intermediate position the needle is lowered onto the rim of a ten-inch record, and if it is in its innermost position then the heedle is lowered onto the rim of a seven-inch record. These positions of the segment 23 are determined by the inclined guides 69 and 70 on the lever 67. If this lever is shifted by the finger wheel 77 so the pointer 71 is opposite number 12, then the guides 69 and 70 are in their outer positions. Then as cam disc 16 rotates the head 29 of pin 27 on section 23, if this section is not in the proper position, will engage one of the inclined camming or guide walls 69 or 70, and as it exits from the narrow space 67' between the inner ends of these guide walls the section 23 is in the proper position for swinging the free end of the tone arm to the proper position over the twelve-inch record and the needle into proper position for playing this record. Similarly, if the pointer 71 is shifted to a position opposite either number 10 or 7 then the guides 69 and 70 are properly positioned to shift head 29 of pin 27 to properly position the section 23 for playing the ten and seven-inch records. The spring 30 on pin 27 provides sufficient friction to retain the section 23 in the position to which it is set by guides 69 and 70 for playing a succession of records of the same diameter.

The lever 50 permits operation of this changer either automatically or manually. When this lever is in the position of Fig. 1 with the finger grip 55 opposite the letter A, the pivot support 49 for the lever 45 is in position for automatic control of the location of the tone arm and needle and successive feeding of the records to the turntable for the playing operation as described above. But if the lever 50 is shifted so finger grip 55 is opposite letter M, this shifts the pivot support 49 and the lever 45 outwardly sufficiently so the flexible spring wire 64 is not engaged by hook 19' at the completion of playing of the record and the automatic control will not function. The changing and playing of the records may then be controlled manually.

Having thus set forth the nature of my invention, I claim:

1. In combination a rotatable turntable, a rotatable cam disc provided with a cut out recess extending inwardly from the peripheral edge, said disc provided with a cam groove in one side surface extending from one side edge of said recess to the other, a driving connection from the turntable to the disc, a pivoted section at one side of said recess provided with a cam groove having an inner end in alignment with the first groove and an exit end in the recess, a pivoted control lever, a pivoted tone arm above the turntable having a free end for carrying a pick-up needle to and from a position over and vertically to and from a record on the turntable, a connection from the control lever to the tone arm to shift said arm to correspond with movements of the control lever, a control rod pivotally mounted on the control lever provided with an offset free end adapted to be shifted to and from a position to run in the cam groove, a finger carried by said rod for swinging it to the cam engaging position, a hook on the cam disc in position to engage said finger when the needle reaches the inner end of the record sound groove to swing the free end of the control rod to cam groove engaging position, said free end cooperating with the exit end of the groove in the pivoted section of the cam to position the needle at the outer entrance end of the sound groove, means providing a lug on the pivoted section for shifting it to different angular positions to shift the exit from its groove to position the needle to play records of different diameters, friction means for retaining the pivoted section in the different angular positions, and a manually adjustable guide means movable to different positions to engage said lug on the pivoted section to shift this section to different angular positions for playing records of different diameters.

2. In combination a rotatable turntable, a pivoted tone arm above the turntable having a free end for carrying a pick-up needle to and from a position over and vertically to and from a record on the turntable, a pivotally mounted control lever, operative connections from the control lever capable of swinging the tone arm to and from its position over the record and vertically to position the needle on or lift it from the record, a rotatable cam disc provided with an eccentric cam groove and with an inclined entrance to and an inclined exit from said groove, a pivoted control rod on said lever provided with a free end portion movable to and from a running position in the cam groove and by coaction with said groove capable of operating the tone arm operating means to shift this arm to and from playing position, means on the cam disc to shift said free end portion into alignment with the entrance to the cam groove when the needle reaches the end of a playing operation, a cam section pivotally mounted as a part of the cam disc and having in it the exit portion of the cam groove including the inclined exit portion thereof to control positioning of the tone arm at the beginning of the playing operation, said cam section being shiftable to different angular positions to locate said inclined exit portion of the cam groove at different positions capable of determining the position the needle is placed on a record at the beginning of the playing operation, a positioning lug carried by said pivoted section, and a manually shiftable control means cooperating with said lug to shift the cam section to different determined positions to control placing of the needle at the proper starting position on records of different diameters.

3. The combination according to claim 2 in which there is friction means to retain the pivoted cam section in different angular positions, and the manual means cooperating with the lug on the section comprises two spaced oppositely inclined guides leading to a narrow exit passage between them and adapted to guide the lug to said passage to position the cam section as determined by different positions of said guides.

4. The combination according to claim 2 in which the means for shifting the free end portion of the control rod to alignment with the entrance to the cam groove comprises a flexible spring wire finger on said free end portion and a hook at the edge of the cam disc in position to engage this finger and swing the free end portion of the rod to the cam groove running position.

5. The combination according to claim 2 in which the means for shifting the free end portion of the control rod to alignment with the entrance to the cam groove comprises a flexible spring wire finger on said free end portion and a hook at the edge of the cam disc in position to engage this finger and swing the free end portion of the rod to the cam groove running position, the cam section is shiftable to different angular positions to shift the inclined exit from the cam groove in this section to different locations to position said free end of the control lever as it rides off said inclined exit portion to position the tone arm and rest the needle in proper playing position on records of different diameters.

6. The combination according to claim 2 in which there is a central post extending upwardly from the turntable provided with a shoulder on which a stack of records threaded onto the post may rest, a lever means in the post capable of shifting the lower record of the stack off said shoulder to permit it to pass down the post onto the turntable and which lever means includes an extension extending below the turntable, and the free end of control rod on the control lever opposite said first free end portion is in position to engage said lever projecting from the post when the control rod is in position to place the tone arm in its outer position and operate the lever means to shift the record from its shoulder on the post.

7. In combination a rotatable turntable, a pivoted tone arm above the turntable having a free end for carrying a pick-up needle to and from a position over and vertically to and from a record on the turntable, a pivotally mounted control lever, operative connections from the control lever capable of swinging the tone arm to and from its position over the record and vertically to position the needle on or lift it from the record, a rotatable cam disc provided with an eccentric cam groove and with an inclined entrance to and an inclined exit from said groove, a pivoted control rod on said lever provided with a free end portion movable to and from a running position in the cam groove and by coaction with said groove capable of operating the tone arm operating means to shift this arm to and from playing position, means to position said free end portion of the control rod in alignment with the entrance to the cam groove when the tone arm reaches the end of the playing operation, a movable section on the cam disc provided with the exit portion of the cam groove adapted to position the control rod to determine the position at which the tone arm is located to place the needle in playing position on the record, and means to shift the movable section to different positions to place the exit from its cam groove in different positions to control positioning of the tone arm to place the needle in proper starting position on records of different diameters.

References Cited in the file of this patent

UNITED STATES PATENTS

| | | |
|---|---|---|
| 2,328,052 | Butler | Aug. 31, 1943 |
| 2,339,981 | Cranmer et al. | Jan. 25, 1944 |
| 2,397,932 | Erwood et al. | Apr. 9, 1946 |